United States Patent
Hara

(10) Patent No.: US 10,635,257 B2
(45) Date of Patent: Apr. 28, 2020

(54) DISPLAY CONTROL APPARATUS, NON-TRANSITORY COMPUTER-READABLE STORAGE MEDIUM AND DISPLAY CONTROL METHOD

(71) Applicant: FUJITSU LIMITED, Kawasaki-shi, Kanagawa (JP)

(72) Inventor: Shuji Hara, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 15/478,689

(22) Filed: Apr. 4, 2017

(65) Prior Publication Data

US 2017/0300179 A1 Oct. 19, 2017

(30) Foreign Application Priority Data

Apr. 15, 2016 (JP) .................. 2016-082309

(51) Int. Cl.
| | |
|---|---|
| G06F 13/00 | (2006.01) |
| G09G 5/00 | (2006.01) |
| G09G 5/02 | (2006.01) |
| G06F 3/0484 | (2013.01) |
| G06F 3/0481 | (2013.01) |
| G09G 5/06 | (2006.01) |
| G06F 3/14 | (2006.01) |
| H04L 29/06 | (2006.01) |

(52) U.S. Cl.
CPC .............. *G06F 3/0481* (2013.01); *G06F 3/14* (2013.01); *G09G 5/06* (2013.01); *G09G 2370/022* (2013.01); *H04L 67/42* (2013.01)

(58) Field of Classification Search
CPC .................................................. G06F 3/0481
See application file for complete search history.

(56) References Cited

U.S. PATENT DOCUMENTS

| | | | |
|---|---|---|---|
| 6,809,741 B1 * | 10/2004 | Bates ................... | G06F 3/0481 345/597 |
| 8,154,778 B2 * | 4/2012 | Patton ................... | G06T 11/001 358/2.1 |
| 2002/0097263 A1 | 7/2002 | Fukuda | |
| 2009/0328111 A1 | 12/2009 | Nakajima | |
| 2010/0095214 A1 | 4/2010 | Ferlitsch | |

(Continued)

FOREIGN PATENT DOCUMENTS

| | | |
|---|---|---|
| JP | 2002-222141 | 8/2002 |
| JP | 2010-009336 | 1/2010 |
| JP | 2010-092486 | 4/2010 |

*Primary Examiner* — Amy Ng
*Assistant Examiner* — David Tan
(74) *Attorney, Agent, or Firm* — Fujitsu Patent Center

(57) ABSTRACT

A display control apparatus including a memory that stores color arrangement information defining a first combination of a background color and a text color, and a processor coupled to the memory and the processor configured to obtain first display information including a second combination of the background color and the text color from the first device, the display information indicating a content of a user interface related to the first device, and cause a display to display a user interface related to the first device based on second display information, the second display information being generated by substituting the first combination for the second combination.

15 Claims, 11 Drawing Sheets

(56) References Cited

U.S. PATENT DOCUMENTS

| | | | |
|---|---|---|---|
| 2010/0174930 A1* | 7/2010 | Kim | G06F 1/3265 |
| | | | 713/320 |
| 2012/0127198 A1* | 5/2012 | Gundavarapu | G09G 5/026 |
| | | | 345/629 |
| 2013/0212535 A1* | 8/2013 | Kim | G06F 3/0482 |
| | | | 715/841 |
| 2014/0187213 A1* | 7/2014 | Shuster | H04W 4/023 |
| | | | 455/414.1 |
| 2015/0205505 A1* | 7/2015 | Conn | G06F 3/0481 |
| | | | 715/765 |

* cited by examiner

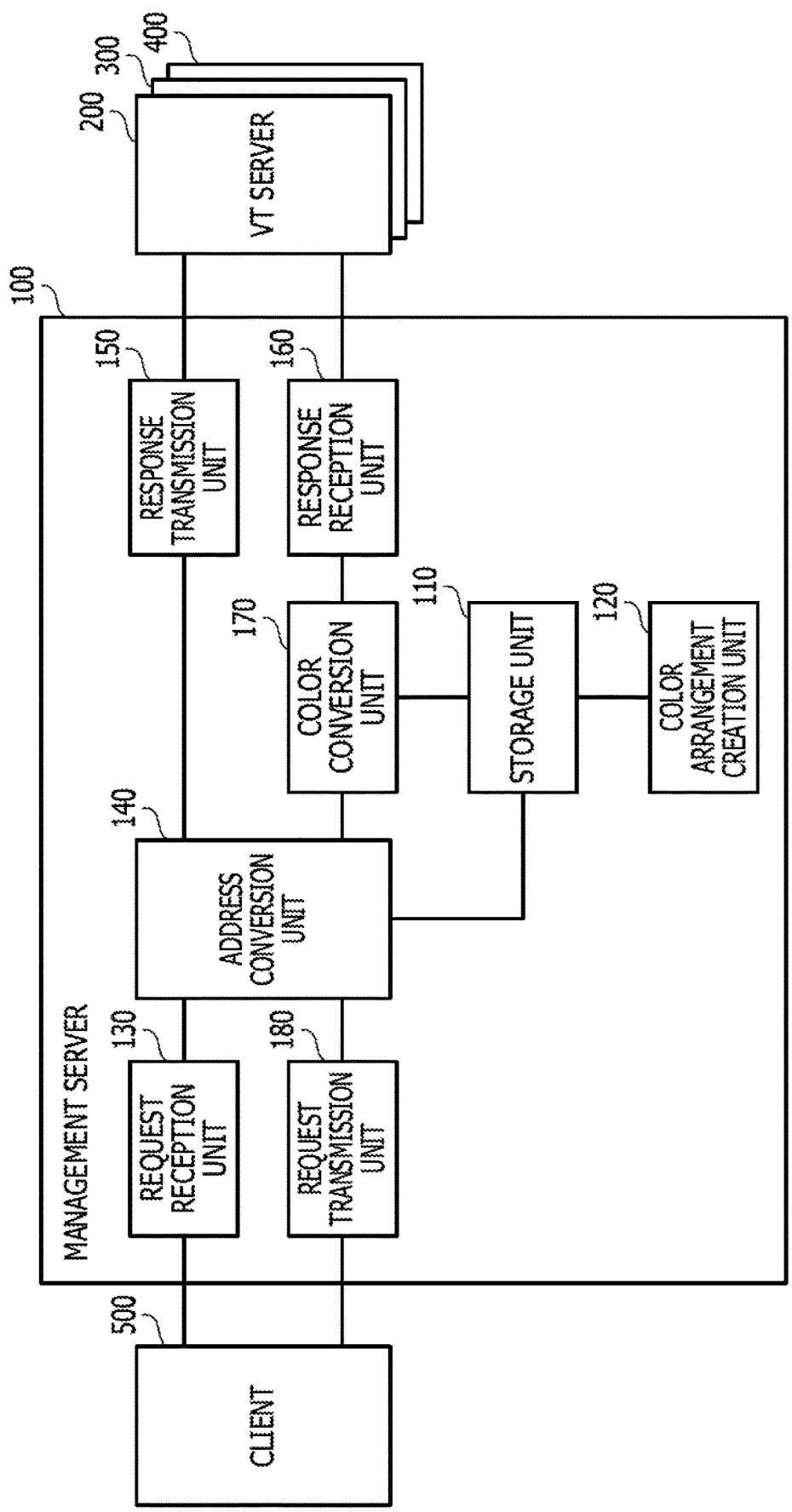

FIG. 6

```
1  [
2      {
3          "url":{                                    //URL GROUP
4          },
5          "frame":{                                  //FRAME GROUP
6          },
7          "colorTable":{                             //COLOR TABLE
8                  "col1_b":#FFFFFF                   //BACKGROUND COLOR1
9                  "col1_f":#000000                   //TEXT COLOR1
10                 "col2_b":#CCFFFF                   //BACKGROUND COLOR2
11                 "col2_f":#000000                   //TEXT COLOR2
12                 ...
13         }
14     },
15     {
16         "url":{                                    //URL GROUP
17                 "url":https://192.168.1.100/main   //URL
18                 "url":https://192.168.1.100/create //URL
19         },
20         "frame":{                                  //FRAME GROUP
21         },
22         "colorTable":{                             //COLOR TABLE
23                 "col1_b":#FFFFFF                   //BACKGROUND COLOR1
24                 "col1_f":#000000                   //TEXT COLOR1
25                 ...
26         }
27     },
28     {
29         "url":{                                    //URL GROUP
30         },
31         "frame":{                                  //FRAME GROUP
32                 "selector":"Contents1"             //SELECTOR INFORMATION
33                 "selector":"Contents2"             //SELECTOR INFORMATION
34         },
35         "colorTable":{                             //COLOR TABLE
36                 "col1_b":#FFFFFF                   //BACKGROUND COLOR1
37                 "col1_f":#000000                   //TEXT COLOR1
38                 ...
39         }
40     },
41 ]
```

FIG. 7

| CANCELLATION COUNT MANAGEMENT TABLE | | | | 112 |
|---|---|---|---|---|
| ITEM NUMBER | URL | COUNT | THRESHOLD VALUE | |
| 1 | https://192.168.1.100/main_cancel | 1 | 10 | |
| 2 | https://192.168.1.200/create_cancel | 10 | 10 | |
| ... | ... | ... | ... | |

810

```
1  <html lang="xx">
2  <head>
3  ...
4  </head>
5  <body bgcolor="#FFFFFF" text="#AAAAAA">
6  <h3>Sample
7  <hr size="1" width="100%" align="left"
8  noshade >
9  ...
10 </body>
   </html>
```

820

```
1  <html lang="xx">
2  <head>
3  ...
4  </head>
5  <body bgcolor="#FFFFFF" text="#000000">
6  <h3>Sample
7  <hr size="1" width="100%" align="left"
8  noshade >
9  ...
10 </body>
   </html>
```

DISPLAY CONTROL APPARATUS, NON-TRANSITORY COMPUTER-READABLE STORAGE MEDIUM AND DISPLAY CONTROL METHOD

CROSS-REFERENCE TO RELATED APPLICATION

This application is based upon and claims the benefit of priority of the prior Japanese Patent Application No. 2016-082309, filed on Apr. 15, 2016, the entire contents of which are incorporated herein by reference.

Field

The embodiments discussed herein are related to a display control apparatus, a non-transitory computer-readable storage medium and a display control method.

Background

Nowadays, various types of information devices are connected to networks. Some information devices allow an operation setting to be done via a network. For example, such an information device has a function of providing a graphical user interface (GUI) for the operation setting to a client device via a network, and provides, in response to a request from the client device, the GUI for the operation setting to the client device.

For example, there is a proposal of a system in which reception devices, distribution devices that distribute contents to the reception devices, and a management device that manages a GUI to be displayed on the reception devices for operating the functions of the distribution devices are connected to a customer-premise network. In this proposal, the management device makes a GUI creation server outside the customer-premise network create a GUI to be provided to the reception device.

There is another proposal of generating an integral UI by integrating UIs different among models of devices such that items of collectively settable parameters are each integrated (displayed) on the integral UI. Moreover, there is still another proposal that a server receives screen display selection information from a client, selects a screen display format of a file to be distributed, and distributes the file converted in the selected screen display format (the presence or absence of an image or a size of the image, display resolution, combination of colors, and the like).

As examples of the related art, Japanese Laid-open Patent Publications Nos. 2010-9336, 2010-92486, and 2002-222141 are known.

SUMMARY

According to an aspect of the invention, a display control apparatus including a memory that stores color arrangement information defining a first combination of a background color and a text color, and a processor coupled to the memory and the processor configured to obtain first display information including a second combination of the background color and the text color from the first device, the display information indicating a content of a user interface related to the first device, and cause a display to display a user interface related to the first device based on second display information, the second display information being generated by substituting the first combination for the second combination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating a function example of the management server;

FIG. 6 is a diagram illustrating an example of color arrangement information;

FIG. 7 is a diagram illustrating an example of a cancellation count management table;

DESCRIPTION OF EMBODIMENTS

A single system product is made by combining information devices of various vendors or various models in some cases. In this case, GUIs provided by the respective information devices may be used to operate the respective information devices. However, color designs of the GUIs provided by the respective information devices are different from one another among the vendors or the models. Accordingly, if the existing GUIs provided by the respective information devices are used without any change, the GUIs having no sense of uniformity as a system product may be provided to a user.

In one conceivable method to address this, a system developer may edit display information based on which the GUIs of the information devices are formed, thereby to make the design such as a background color and a text color standardized. However, since the GUIs are different among the vendors or models, the design change in all the GUIs may have a problem in requested man-hours. Moreover, a skill for the design change is also requested because the change work may have a risk (for example, level deterioration in the existing system).

In one aspect, an object is to improve a work efficiency of a design change in user interface.

Hereinafter, embodiments are described in details with reference to the drawings.

First Embodiment

Figure 1:
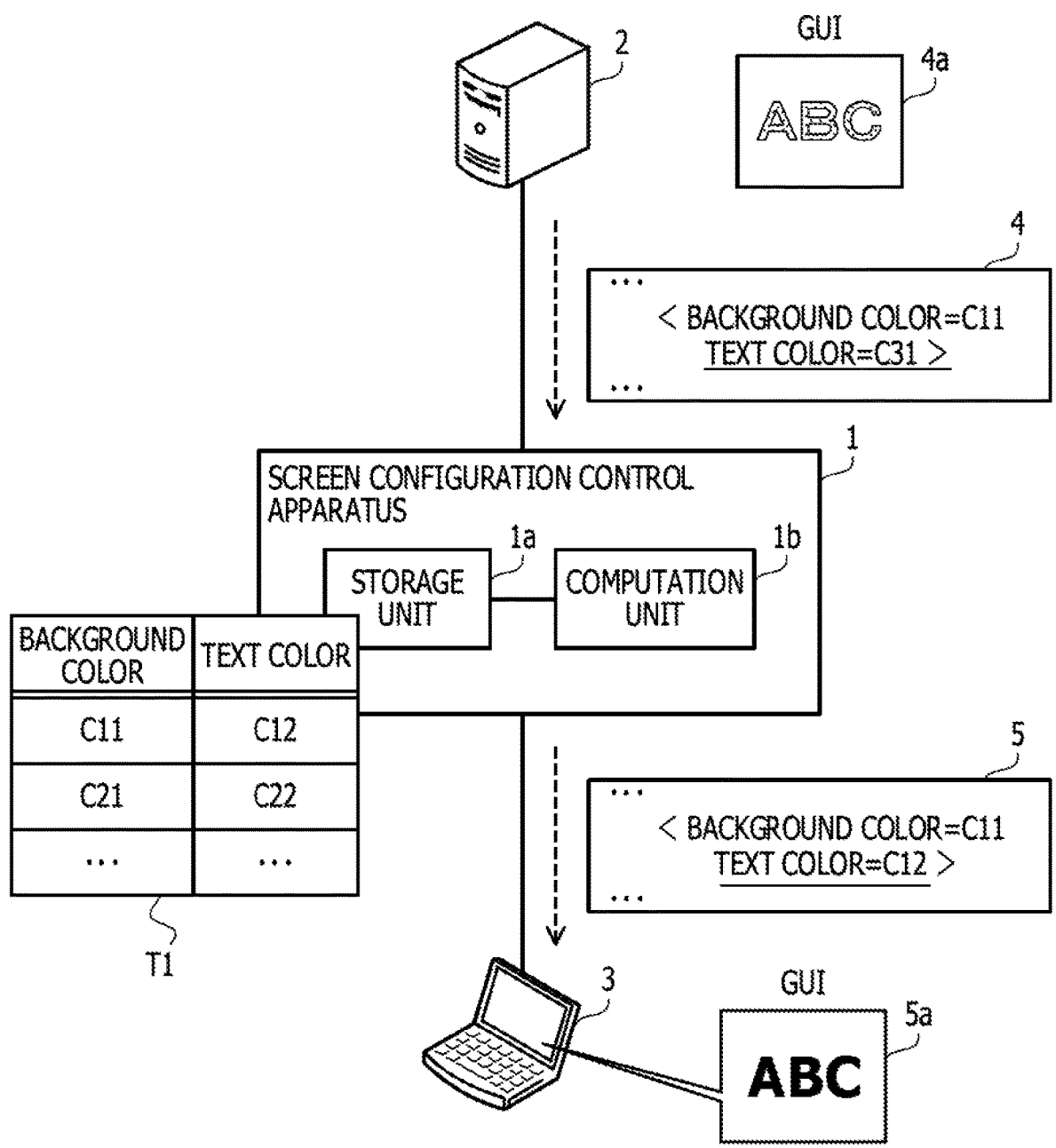
FIG. 1 a diagram illustrating a screen configuration control apparatus according to a first embodiment.

FIG. 1 a diagram illustrating a screen configuration control apparatus according to a first embodiment. A screen configuration control apparatus 1 is connected to a server 2 and a client 3. The screen configuration control apparatus 1 may preferably be connected to the server 2 and the client 3 via a network. The server 2 is a server computer that provides a user interface for an operation setting of the server 2. The client 3 is a client computer that performs a setting of the server 2.

The screen configuration control apparatus 1 provides the client 3 with display information indicating a content of the user interface for use to set the server 2. Specifically, the screen configuration control apparatus 1 converts display information on the GUI that is provided by the server 2 in accordance with a predetermined rule, and transmits the converted display information to the client 3.

For example, the server 2 may preferably function as a Web server, and provide the GUI as data in a hypertext markup language (HTML) format. In other words, the display information may preferably be data in the HTML format. The client 3 may preferably function as a Web browser, and display a GUI in accordance with the HTML data using a display included in the client 3. For example, a user may perform an operation setting of the server 2 by operating the GUI displayed by the client 3. The server 2 requests to be a device that functions as a Web server, and may preferably be a switch device or a storage device, for example. Moreover, the server 2 may preferably be called a first device. The client 3 may preferably be called a second device.

The screen configuration control apparatus 1 includes a storage unit 1a and a computation unit 1b. The storage unit 1a may preferably be a volatile storage device such as a random access memory (RAM), or may preferably be a nonvolatile storage device such as a hard disk drive (HDD) or a flash memory. The computation unit 1b may include a central processing unit (CPU), a digital signal processor (DSP), an application specific integrated circuit (ASIC), an field programmable gate array (FPGA), and others. The computation unit 1b may preferably be a processor that executes a program. The "processor" mentioned herein may include a set (multi-processor) of multiple processors.

The storage unit 1a stores therein color arrangement information T1. The color arrangement information T1 is information in which a first combination of a background color and a text for a GUI that is provided by the server 2 is defined. In the color arrangement information T1, registered are allowable combinations as a combination of a background color and a text color for a GUI to be provided to the client 3. The color arrangement information T1 includes one or multiple first combinations. For example, the color arrangement information T1 includes the following combinations as the first combination. Firstly, the color arrangement information T1 includes a combination of a background color "C11" and a text color "C12". Secondly, the color arrangement information T1 includes a combination of a background color "C21" and a text color "C22". The color arrangement information T1 may include combinations other than these combinations. For example, the computation unit 1b acquires in advance the color arrangement information T1 (accepts an input of the color arrangement information T1 by a user, for example), and holds the acquired color arrangement information T1 in the storage unit 1a.

The computation unit 1b receives display information 4 from the server 2. The display information 4 is information that is used for displaying a GUI 4a. For example, the computation unit 1b may preferably accept a request of acquiring a GUI from the client 3, transfer the request to the server 2, and receive the display information 4 as a response to the request from the server 2. Moreover, the display information 4 may preferably be called first display information.

The display information 4 includes information in which a second combination of a background color and a text color that are included in the GUI 4a is defined. The background color and the text color are each expressed with predetermined identification information. The identification information may preferably be a name of a color or a predetermined code indicating the color. For example, the display information 4 includes information on the background color "C11" and a text color "C31" of the GUI 4a. This represents that when the GUI 4a includes a text string of "ABC", a color of the background for the text string "ABC" is displayed in a color indicated by "C11", and the text string "ABC" itself is displayed in a color indicated by "C31".

The computation unit 1b creates display information 5 in accordance with a comparison between the first combination included in the color arrangement information T1 and the second combination included in the display information 4 such that a setting specified in the second combination in the display information 4 is converted into a setting specified in the first combination. The display information 5 is information for use to display a GUI 5a. The display information 5 may preferably be called the second display information. For example, the computation unit 1b may preferably search the combinations registered in the color arrangement information T1 for a background color that matches the background color included in the display information 4, and apply the searched-out combination to the display information 4, thereby creating the display information 5. The following describes more specifically.

The computation unit 1b refers to the display information 4 to detect that a combination of the background color "C11" and the text color "C31" is defined. The computation unit 1b checks the combination of the background color "C11" and the text color "C31" against each of the combinations registered in the color arrangement information T1. For example, a combination of the background color "C11" and the text color "C12" is registered in the color arrangement information T1. When the combination of the background color "C11" and the text color "C31" is compared with the combination of the background color "C11" and the text color "C12", the background colors "C11" match each other. Accordingly, the computation unit 1b changes the text color "C31" in the combination of the background color "C11" and the text color "C31" to the text color "C12" thereby causing the combination to match the combination registered in the color arrangement information T1. In other words, the computation unit 1b converts the combination of the background color "C11" and the text color "C31" at a portion where the combination is defined in the display information 4 into a combination of the background color "C11" and the text color "C12". In this manner, the computation unit 1b creates the display information 5 based on the display information 4. Note that, although the example in which the text color in the display information 4 is converted based on the background color registered in the color arrangement information T1, the target of conversion may be reversed. In other words, the computation unit 1b may preferably covert the background color in the display information 4 based on the text color registered in the color arrangement information T1 (note that only the text color may preferably be converted based on the background color).

The computation unit 1b transmits the created display information 5 to the client 3. For example, the client 3 receives the display information 5, and displays, based on the display information 5, the GUI 5*a* on the display that is included in the client 3. The GUI 5*a* is displayed in an arrangement of colors different from that of the GUI 4*a*. Specifically, the background color is a color indicated by "C11" and the text color is a color indicated by "C31" in the GUI 4*a*, whereas the background color is the color indicated by "C11" and the text color is a color indicated by "C12" in the GUI 5*a*. A user may perform an operation setting on the server 2 by operating the GUI 5*a*.

Meanwhile, a single system product (may be referred to as integrated device) is made by combining information devices of various vendors or various models in some cases. The server 2 in the first embodiment may preferable be considered as a single integrated device that includes a switch device and a storage device, for example. Thus, the switch device and the storage device included in the server 2 may independently provide GUIs for the operation setting. However, if the existing GUIs provided by the respective information devices are used without any change, the GUIs having no sense of uniformity as a system product may be provided to a user. For example, if the text colors for use to display a warning or an error on the background color are different among devices, an operating support may have a trouble in that, for example, a suitable alert may not be provided to the user.

In this case, a system developer may edit display information based on which the GUIs of the information devices are formed, thereby to make the design such as a background color and a text color standardized as the system product. However, since the GUIs are different among the vendors or models, the design change in all the GUIs may have a problem in requested man-hours. Moreover, a skill for the design change is also requested because the change work may have a risk (the level deterioration, a part of the function in the existing system becomes unavailable or a bug is generated, for example).

Therefore, the screen configuration control apparatus 1 converts an arrangement of colors of the display information 4 that is provided from the server 2 into a predetermined arrangement of colors using the color arrangement information T1, and provides the converted arrangement of colors to the client 3. For example, a user request to set a combination of a background color and a text color to the color arrangement information T1, but does not requested to directly edit the display information 4. This makes it possible to omit a work by the user due to the change in color design of the GUI, and improve the work efficiency in design change of the GUI.

Moreover, changing the arrangement of colors between a background color and a text color of the GUI is changed based on the color arrangement information T1 makes it possible to provide a GUI with the uniform color design to some extent to the user regardless of different vendors and different models of the devices serving as provision sources of the respective GUIs. Accordingly, in a single system product (integrated device) in which information devices of various vendors or various models are combined, the screen configuration control apparatus 1 is especially useful when an existing GUI in each device is applied. In this case, the user requests to define, as the color arrangement information T1, combinations of a background color and a text color in accordance with the tendency of the arrangement of colors that is used in the GUIs of the respective devices and the respective vendors. This enables the screen configuration control apparatus 1 to provide a GUI with the uniform arrangement of colors as a system product based on the color arrangement information T1 to the user. Providing the GUI with the uniform arrangement of colors as a system product based on the color arrangement information T1 to the user makes it possible to impart uniformity to the text colors for use to display various kinds of notifications (for example, a setting content, a warning, and an error) based on the background color, for example, and contribute a suitable operating support.

Hereinafter, a system including a virtual tape (VT) library is exemplified as an example of an integrated device, and a function of the screen configuration control apparatus 1 will be described in details.

Second Embodiment

Figure 2:
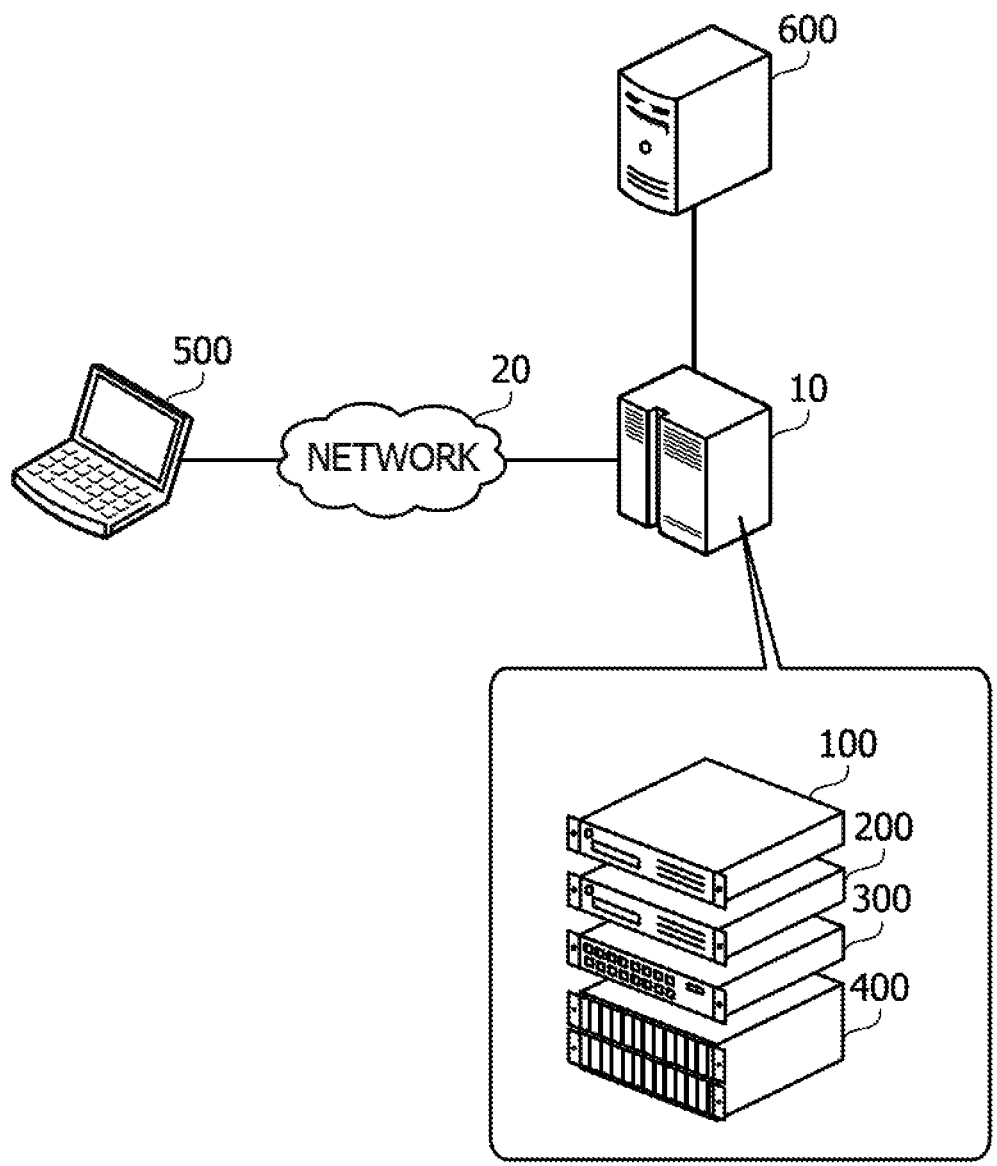
FIG. 2 is a diagram illustrating an example of a VT library according to a second embodiment.

FIG. 2 is a diagram illustrating an example of a VT library according to a second embodiment. A VT library 10 is an integrated device including multiple devices. The VT library 10 includes a management server 100, a VT server 200, a switch 300, and a storage 400. Moreover, the VT library 10 is connected to a network 20. The network 20 is, for example, a local area network (LAN). A client 500 is connected to the network 20. In addition, the VT library 10 is connected to a server 600. An interface between the VT library 10 and the server 600 is, for example, a fiber channel.

The VT library 10 stores therein various kinds of data that are processed by the server 600. The VT library 10 virtually operates a function of holding data with magnetic tape using a storage device such as an HDD thereby to attain an increase in the speed of tape processing. The VT library 10 reads and writes a tape volume from and to a cartridge tape using a tape device that is included in the VT library 10 or a tape device that is externally attached to the VT library 10, in some cases.

The management server 100 is a server computer that changes color designs of GUIs that are respectively provided by the VT server 200, the switch 300, and the storage 400 to provide the changed GUIs to the client 500.

The VT server 200 is a server computer that manages the tape volume held in the storage 400, and provides a function of virtually executing tape processing.

The switch 300 is a relay device that relays communication among the devices in the VT library 10. For example, the VT library 10 may preferably be provided with multiple switches 300, and achieve redundant communication paths among the devices.

The storage 400 is a disk array that stores therein the tape volume. The storage 400 may preferably be provided with multiple storage devices such as HDDs and solid state drives (SSDs), and use a technology of redundant arrays of inexpensive disks (RAID), thereby implementing a logical storage area in which storage areas of the multiple storage devices are integrated.

The VT server 200, the switch 300, and the storage 400 respectively function as Web servers. The VT server 200, the switch 300, and the storage 400 respectively provide, in response to a request for a GUI, respective GUIs for the operation setting of the VT server 200, the switch 300, and the storage 400, to a request source. A GUI is provided in such a manner that data such as HTML data and cascading style sheets (CSS) data for use to display the GUI is transmitted to the request source.

The client 500 is a client computer that accepts an operation of the VT library 10 by a user. The client 500 functions as a Web browser. The Web browser of the client 500 receives HTML data and CSS data from the VT library 10, and display a GUI in accordance with the received HTML data and CSS data.

For example, the user of the VT library 10 may perform operation settings of the VT server 200, the switch 300, and the storage 400, respectively, by operating the GUIs that are displayed by the client 500. Here, information such as HTML data and CSS data for use to display a GUI is collectively referred to as document object model (DOM) data hereinafter.

Figure 3:
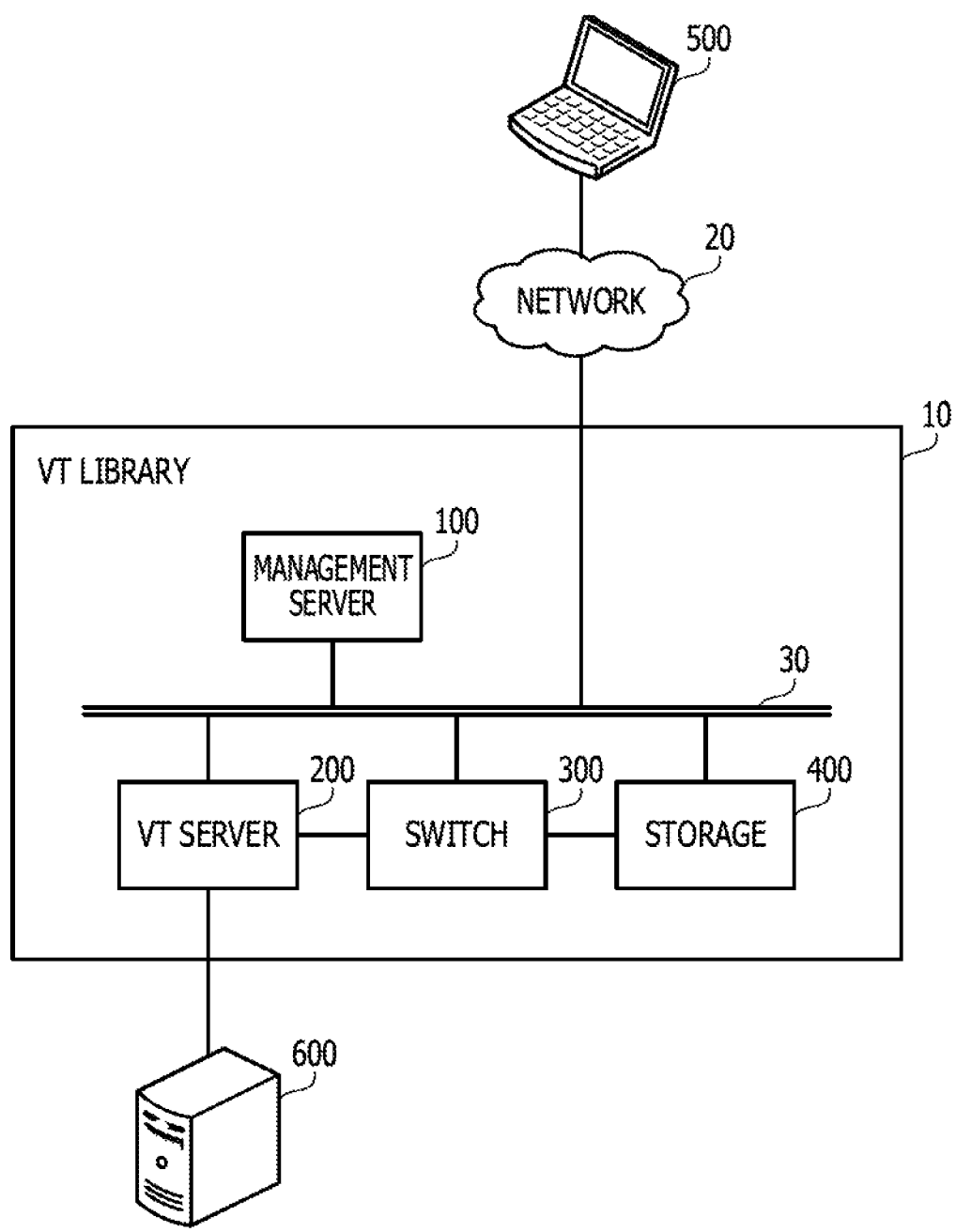
FIG. 3 is a diagram illustrating a hardware example of the VT library.

FIG. 3 is a diagram illustrating a hardware example of the VT library. As described in the foregoing, the VT library 10 includes the management server 100, the VT server 200, the switch 300, and the storage 400. The management server 100, the VT server 200, the switch 300, and the storage 400 are connected to a network 30. The network 30 is a management network provided in the VT library. The network 30 is connected to the network 20. The management server 100 and the client 500 are communicable with each other via the networks 20 and 30. Moreover, the VT server 200 is connected to the server 600 using a predetermined communication interface (for example, fiber channel).

Here, the VT server 200, the switch 300, and the storage 400 are different from one another in terms of both of model and vender. Accordingly, the VT server 200, the switch 300, and the storage 400 provide respective GUIs of different arrangements of colors. Then, if the GUIs respectively provided by the VT server 200, the switch 300, and the storage 400 are used without any change, the arrangements of colors of the GUIs displayed by the client 500 have no sense of uniformity, which may cause an adverse affection on an operating support. Therefore, DOM data provided by each of the management server 100 the VT server 200, the switch 300, and the storage 400 is converted in accordance with a predetermined rule thereby to impart uniformity to the arrangements of colors of the GUIs displayed by the client 500.

Figure 4:
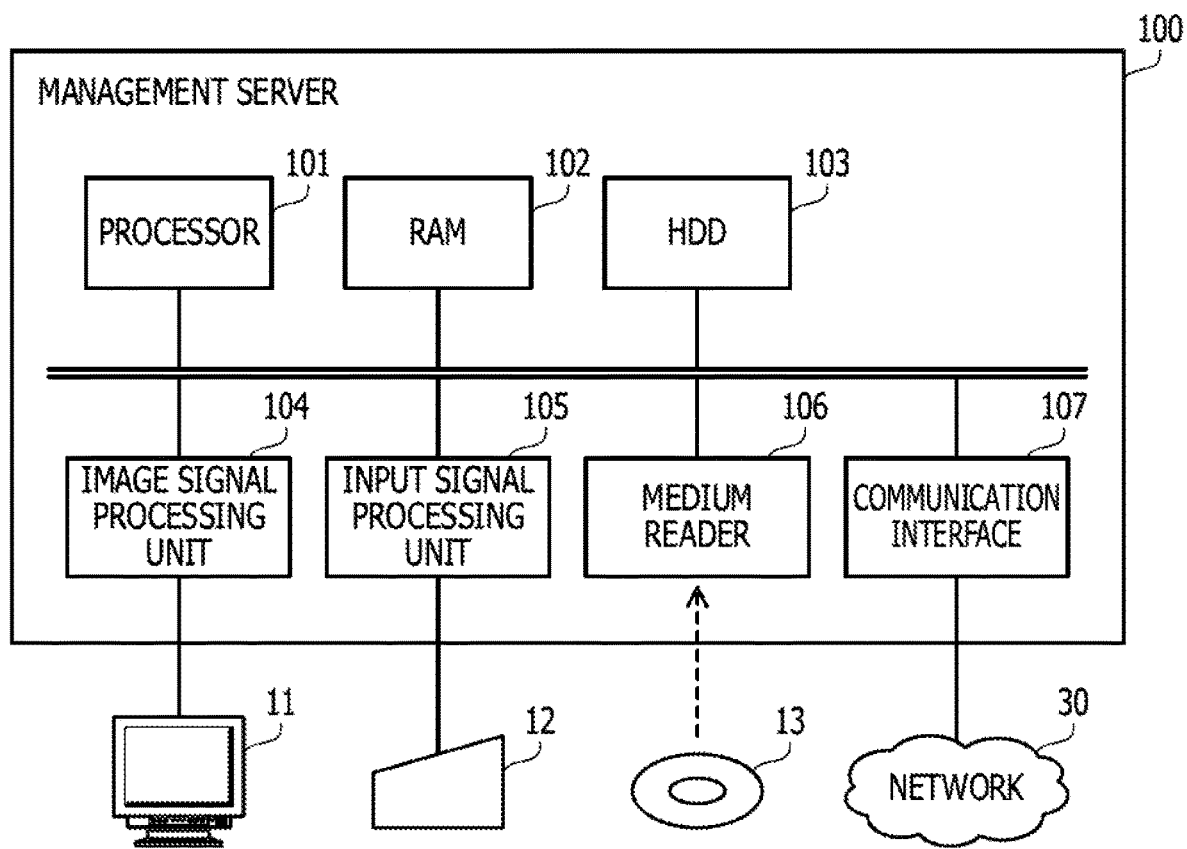
FIG. 4 is a diagram illustrating a hardware example of a management server.

FIG. 4 is a diagram illustrating a hardware example of a management server. The management server 100 includes a processor 101, a RAM 102, an HDD 103, an image signal processing unit 104, an input signal processing unit 105, a medium reader 106, and a communication interface 107. The respective units are connected to a bus in the management server 100.

The processor 101 controls information processing of the management server 100. The processor 101 may preferably be a multi-processor. The processor 101 is, for example, a CPU, a DSP, an ASIC, or an FPGA. The processor 101 may preferably be a combination of two or more elements among the CPU, the DSP, the ASIC, the FPGA, and other elements.

The RAM 102 is a main storage device of the management server 100. The RAM 102 temporarily stores therein at least a part of an operating system (OS) program or application programs to be executed by the processor 101. Moreover, the RAM 102 stores therein various kinds of data for use in processing by the processor 101.

The HDD 103 is an auxiliary storage device of the management server 100. The HDD 103 magnetically reads and writes data into and from a magnetic disk that is embedded therein. The HDD 103 stores therein programs of the OS, application programs, and various kinds of data. The management server 100 may preferably be provided with another type of an auxiliary storage device such as a flash memory or an SSD, or may preferably be provided with multiple auxiliary storage devices.

The image signal processing unit 104 outputs, in accordance with an instruction from the processor 101, an image on a display 11 connected to the management server 100. As for the display 11, a cathode ray tube (CRT) display, a liquid crystal display, or other displays may be used.

The input signal processing unit 105 acquires an input signal from an input device 12 connected to the management server 100, and outputs the input signal to the processor 101. As for the input device 12, for example, a pointing device such as a mouse or a touch panel, a key board, or other devices may be used.

The medium reader 106 is a device that reads a program or data recorded on a recording medium 13. As for the recording medium 13, for example, a magnetic disk such as a flexible disk (FD) or an HDD, an optical disc such as a compact disc (CD) or a digital versatile disc (DVD), or a magneto-optical disk (MO) may be used. Moreover, as for the recording medium 13, for example, a nonvolatile semiconductor memory such as a flash memory card also may be used. The medium reader 106 holds, for example, in accordance with an instruction from the processor 101, a program or data read from the recording medium 13, in the RAM 102 or the HDD 103.

The communication interface 107 communicates with other devices via the network 30. The communication interface 107 may preferably be a wired communication interface or a wireless communication interface.

Here, the VT server 200 may also be implemented by using the units similar to those of the management server 100. Moreover, the switch 300 and the storage 400 may also be implemented by hardware provided with a processor and a RAM similar to that of the management server 100 (note that, a part of the hardware such as an image signal processing unit or a medium reader requests not to be provided).

FIG. 5 is a diagram illustrating a function example of the management server. The management server 100 includes a storage unit 110, a color arrangement creation unit 120, a request reception unit 130, an address conversion unit 140, a request transmission unit 150, a response reception unit 160, a color conversion unit 170, and a response transmission unit 180. The storage unit 110 is implemented as a storage area that is reserved in the RAM 102 or the HDD 103. The color arrangement creation unit 120, the request reception unit 130, the address conversion unit 140, the request transmission unit 150, the response reception unit 160, the color conversion unit 170, and the response transmission unit 180 are implemented in such a manner that the processor 101 executes a program stored in the RAM 102.

The storage unit 110 stores therein various kinds of information for use in processing by the address conversion unit 140 or processing by the color conversion unit 170. For example, the storage unit 110 stores therein color arrangement information. The color arrangement information is information for use in color conversion by the color conversion unit 170. Moreover, the storage unit 110 stores therein a cancellation count management table. The cancellation count management table is a table for managing the number of times that the cancel operation or the back operation is performed on the GUI by a user who operates the client 500. The number of times that the cancel operation or the back operation is performed may preferably be considered as the number of times that the management server 100 accepts a press-down operation of a cancel button or a back button provided on the GUI or the number of times that the management server 100 transmits a GUI in accordance with the press-down operation, for example.

The color arrangement creation unit 120 acquires color arrangement information. Specifically, the color arrangement creation unit 120 accepts an input of color arrangement information by a user. The color arrangement creation unit 120 holds the accepted color arrangement information in the storage unit 110. For example, the user of the VT library 10 may input color arrangement information into the management server 100 by operating the input device 12. Alternatively, the user may also input color arrangement information into the management server 100 via the networks 20 and 30 by operating the client 500.

The request reception unit 130 receives a hypertext transfer protocol (HTTP) request (hereinafter, simply referred to as request) from the client 500. For example, the request is issued by the Web browser of the client 500. A destination of the request is designated by a uniform resource locator (URL) that the management server 100 publishes. In other words, the destination of the request that the request reception unit 130 receives is an address (for example, Internet protocol (IP) address) of the management server 100. A transmission source thereof is an address of the client 500.

The address conversion unit 140 converts the transmission source and the destination of the request received by the request reception unit 130. Specifically, the address conversion unit 140 converts the transmission source of the request into the address of the management server 100, and converts the destination thereof into an address (address of the VT server 200, the switch 300, or the storage 400) at the back end side in accordance with the destination of the request.

The address conversion unit 140 performs reverse address conversion to the abovementioned conversion in some cases. The case is when the address conversion unit 140 transmits DOM data for GUIs after the color conversion of the VT server 200, the switch 300, and the storage 400 as a response, to the client 500. In other words, the address conversion unit 140 converts a transmission source of the response into the address of the management server 100, and converts a destination thereof into the address of the client 500.

The abovementioned address conversion information (correspondence information between a destination URL that the address conversion unit 140 accepts and a transfer destination IP address) is held in advance in the storage unit 110. The request transmission unit 150 transmits the request after the address conversion by the address conversion unit 140 to a device (the VT server 200, the switch 300, or the storage 400) at the address after the conversion.

The response reception unit 160 receives a response to the request transmitted by the request transmission unit 150. The response includes DOM data that is used for displaying the GUI. The destination of the response that the response reception unit 160 receives is the address of the management server 100. The transmission source thereof is the address of the VT server 200, the switch 300, or the storage 400 that has transmitted the response.

The color conversion unit 170 executes color conversion of DOM data that is included in the response received by the response reception unit 160 based on the color arrangement information stored in the storage unit 110.

The response transmission unit 180 transmits the response after the color conversion by the color conversion unit 170 and after the address conversion by the address conversion unit 140, to the client 500.

FIG. 6 is a diagram illustrating an example of color arrangement information. Color arrangement information 111 is held in advance in the storage unit 110. The color arrangement information 111 is information indicating a rule for the color conversion by the color conversion unit 170.

In the color arrangement information 111, multiple rules for the color conversion may be registered. The rule for the color conversion is expressed by a fixed phrase of ""colorTable":{ }". In the ""colorTable":{ }", one or more combinations of an allowable background color and an allowable text color may be defined between two brace signs ("{ }").

Moreover, the color arrangement information 111 may also designate a URL or a frame that is excluded from the target of color conversion. A URL that is excluded from the target of color conversion is expressed by a fixed phrase of ""url":{ }". In the ""url":{ }", one or more URLs that are excluded from the target of conversion may be defined between the two brace signs ("{ }"). The frame that is excluded from the target of color conversion is expressed by a fixed phrase of ""frame":{ }". In the ""frame":{ }", one or more identification information on the frame that is excluded from the target of color conversion may be defined between the two brace signs ("{ }").

In the color arrangement information 111, it is possible to consider the abovementioned settings for the "url", the "frame", and the "colorTable" collectively as one set. Next, a specific example of the setting content will be described. Hereinafter, line numbers that are assigned for convenience in the color arrangement information 111 in FIG. 6 respectively indicate the contents of the lines.

For example, a portion from line 2 to line 14 in the color arrangement information 111 indicates a default conversion rule. In the setting from line 2 to line 14, a URL and a frame that is excluded from the target of color conversion are not set. Moreover, multiple combinations of a background color and a text color are registered in a part "colorTable:{ . . . }" (line 7 to line 13) in the setting of the portion. Here, "colx_b" (x=1, 2, 3, . . . ) indicates a background color of an x-th combination, and "colx_f" indicates a text color of the x-th combination.

A first combination is ""col1_b":# FFFFFF" and ""col1_f":#000000". The first combination indicates that the background color is "# FFFFFF" and the text color is "#000000". Here, information indicating the color ("# FFFFFF", "#000000", or the like) is information (color code) in which each color specified in a color pallet is converted into a numerical form. As a second combination, information of ""col2_b":# CCFFFF" and ""col2_f": #000000" is also set.

Moreover, a portion from line 15 to line 27 in the color arrangement information 111 indicates a conversion rule when a URL that is excluded from the target of conversion is designated. In the setting from line 15 to line 27, a URL that is excluded from the target of color conversion is set. Specifically, two URLs are registered in a part "url:{ . . . }" (line 16 to line 19). The first URL is "https://192.168.1.100/main". The second URL is "https://192.168.1.100/create". Here, "192.168.1.100" indicates an IP address of the VT server 200. In other words, it is indicated that a URL of a transmission source of the response having "https://192.168.1.100/main" or "https://192.168.1.100/create" is excluded from the target of color conversion. The color conversion unit 170 performs color conversion to URLs other than these two URLs in accordance with the setting of "colorTable" from line 22 to line 26. Here, a setting content from line 22 to line 26 is identical with a setting content from line 7 to line 13.

In addition, a portion from line 28 to line 40 in the color arrangement information 111 indicates a conversion rule when a frame that is excluded from the target of conversion is designated. In the setting from line 28 to line 40, identification information (referred to as selector information) on a frame that is excluded from the target of color conversion is set. Specifically, two selector information is registered in a part ""frame":{ ... }" (line 31 to line 34). The first selector information is "Contents1". The second selector information is "Contents2". In other words, it is indicated that in DOM data included in the response, a frame indicated by the selector information "Contents1" or "Contents1" is excluded from the target of color conversion. In this case, other frames in the DOM data are targets of color conversion. In other words, designating a frame that is excluded from the target of conversion makes it possible to narrow-down frames that are targets of color conversion. The color conversion unit 170 performs color conversion to the frames that are targets of color conversion in accordance with the setting of "colorTable" from line 35 to line 39. Here, a setting content from line 35 to line 39 is identical with the setting content from line 7 to line 13.

Note that, in the example in the second embodiment, display elements to which a given frame belongs have common selector information (for example, a class attribute used in the class selector, and an ID selector used in an identifier (ID) selector). Moreover, different frames have different selector information.

The example of the color arrangement information 111 indicates the three sets of the rules for the color conversion. In accordance with the definition of the color arrangement information 111, the color conversion unit 170 makes DOM data the transmission source of which is either of the two URLs indicated in line 17 and line 18 exclude the target of color conversion. In addition, the color conversion unit 170 makes the two frames indicated in line 32 and line 33, although the URL of which is the target of color conversion, exclude the targets of color conversion.

The definition identical with the color arrangement information 111 may be described as one set. For example, in the color arrangement information 111, the definition in line 17 and line 18 may be inserted into a portion between line 3 and line 4, and the definition in line 32 and line 33 may be inserted into a portion between line 5 and line 6. Even if the statement from line 15 to line 40 is removed after the insertions, the rule equivalent to the rule for the color conversion by the abovementioned three sets may be defined.

FIG. 7 is a diagram illustrating an example of a cancellation count management table. A cancellation count management table 112 is held in the storage unit 110. The cancellation count management table 112 includes items of item number, URL, count, and threshold value.

In the item of item number, a number that identifies a record is registered. In the item of URL, a URL of a GUI that is responded to a cancel operation or a back operation on the browser is registered. In the item of count, the number of times (referred to as the cancellation count) that the GUI is responded to a cancel operation or a back operation on the browser is registered. In the item of threshold value, a threshold value of the cancellation count at which to cancel the color conversion is registered.

For example, information including the item number of "1", the URL of "https://192.168.1.100/main_cancel", the count of "1", and the threshold value of "10" is registered in the cancellation count management table 112.

This indicates that the number of times (the cancellation count) that a GUI of a URL "https://192.168.1.100/main_cancel" to be responded to a cancel operation or a back operation on the browser is responded to the client 500 is one. Moreover, this also indicates that the threshold value of the cancellation count at which to cancel the color conversion of a GUI of a URL including an IP address "192.168.1.100" is 10. In other words, the color conversion unit 170 cancels the color conversion of the GUI (for example, GUI expressed by a URL at the lower order of https://192.168.1.100/) to be provided from the VT server 200 when the cancellation count reaches 10 during a certain period.

Figure 8:
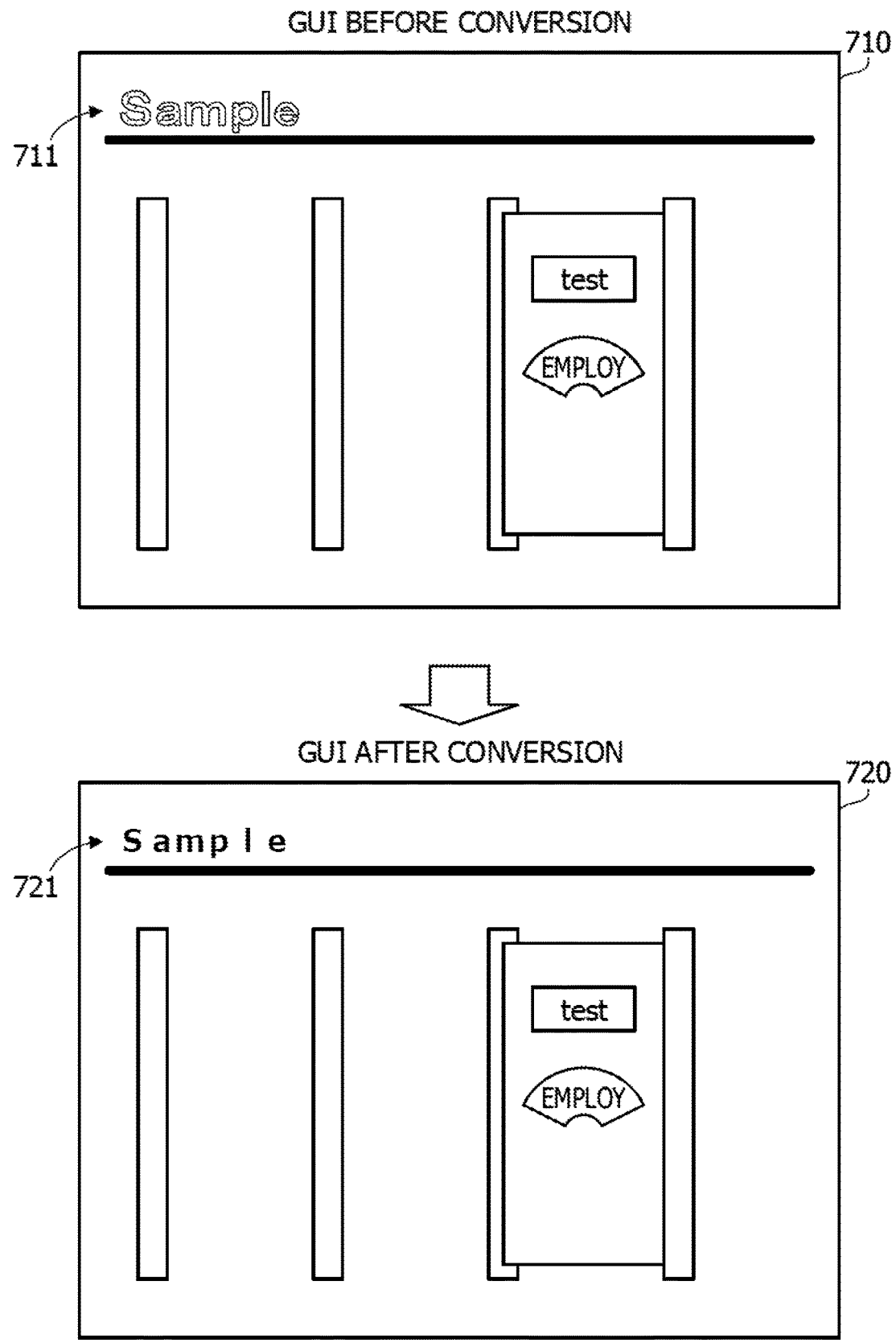
FIG. 8 is a diagram illustrating an example of conversion of a GUI.

FIG. 8 is a diagram illustrating an example of conversion of a GUI. A GUI 710 is an example of a GUI before the color conversion by the color conversion unit 170 is performed. A GUI 720 is an example of a GUI after the color conversion by the color conversion unit 170 has been performed. For example, the GUI 710 includes a text string 711. The text string 711 is a text string of "Sample". The color conversion unit 170 compares a combination of a background color of the GUI 710 and a text color of the text string 711 with the combinations of background colors and text colors that are included in the color arrangement information 111. For example, when detecting that the background color of the GUI 710 is registered in the color arrangement information 111, the color conversion unit 170 extracts a text color combined with the background color from the color arrangement information 111. The color conversion unit 170 converts the color of the text string 711 into the color extracted from the color arrangement information 111, and creates display information on the GUI 720. The GUI 720 includes a text string 721. The text string 721 is a text string of "Sample", which is a result of the color conversion of the text string 711 having been performed.

Figure 9:
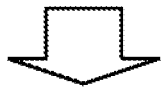
FIG. 9 is a diagram illustrating an example of conversion of DOM data.

FIG. 9 is a diagram illustrating an example of conversion of DOM data. DOM data 810 is HTML data for the GUI 710. DOM data 820 is HTML data created from the DOM data 810 through the color conversion by the color conversion unit 170. Hereinafter, in to the DOM data 810 and 820, numbers respectively assigned to the left sides for convenience are used to indicate respective lines.

For example, information of the background color ("#FFFFFF") and the text color ("#AAAAAA") is registered in the DOM data 810 in the statement in line 5. In other words, the background color of the GUI 710 is a color indicated by "#FFFFFF". The text color of the text string 711 is a color indicated by "#AAAAAA".

Moreover, for example, the statement in the line 5 in the DOM data 820 is changed by the color conversion unit 170 as compared with the DOM data 810. Specifically, information of the background color ("#FFFFFF") and the text color ("#000000") is registered in the statement in line 5. In other words, the background color of the GUI 720 is a color indicated by "FFFFFF". The text color of the text string 721 is a color indicated by "#000000".

Next, a processing procedure of the management server 100 will be described.

Figure 10:
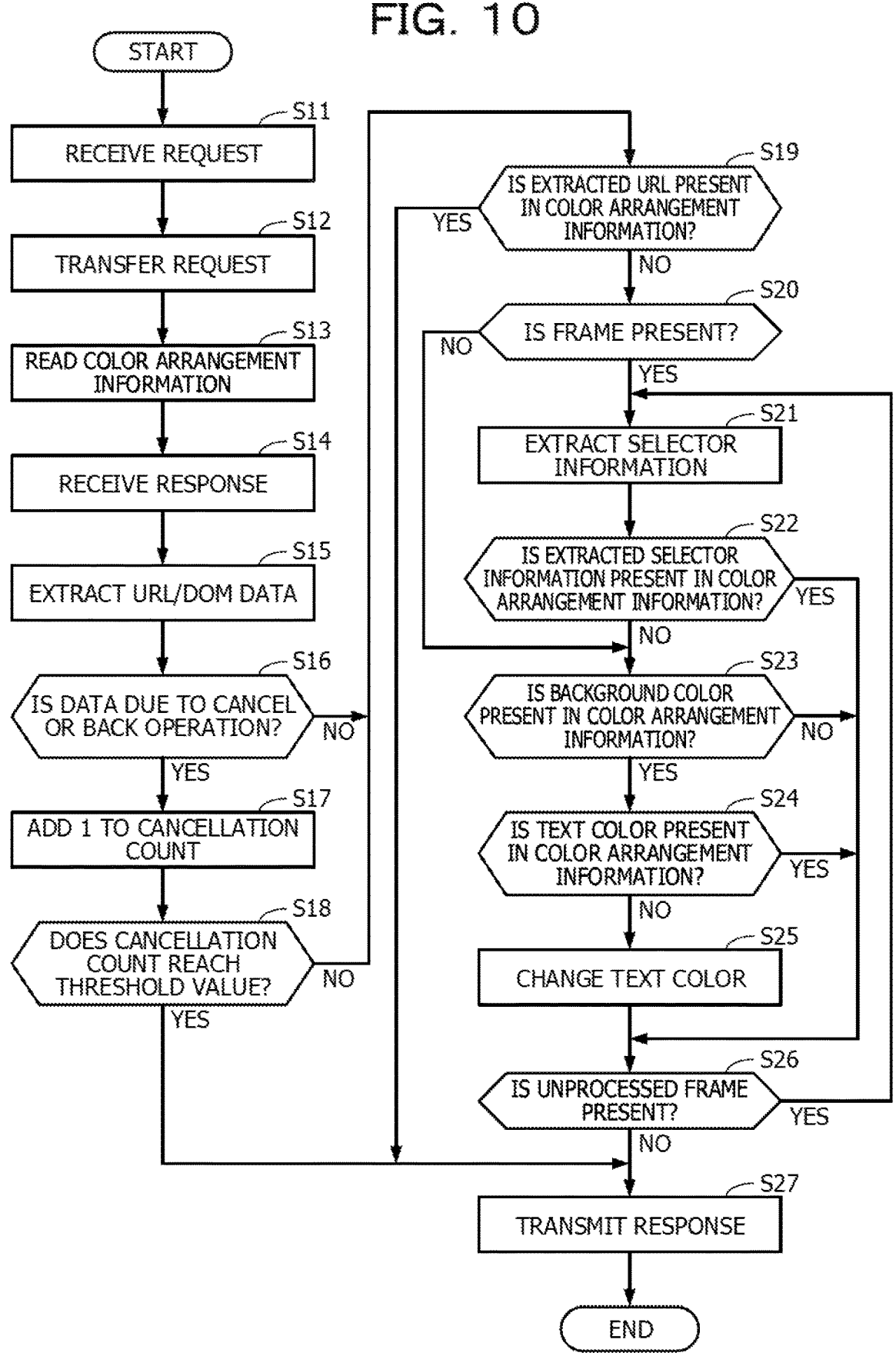
FIG. 10 is a flowchart illustrating a processing example of the management server.

FIG. 10 is a flowchart illustrating a processing example of the management server. Hereinafter, the processing illustrated in FIG. 10 will be described in the order of step numbers.

(S11) The request reception unit 130 receives a request from the client 500. The address conversion unit 140 converts, in accordance with a destination URL included in the request, the destination of the request into a destination of a transfer destination (URL including an IP address including any one of the VT server 200, the switch 300, and the storage 400). Moreover, the address conversion unit 140 converts a transmission source of the request into an IP address of the management server 100.

(S12) The request transmission unit 150 transmits the request after address conversion by the address conversion unit 140. The request reaches a device (the VT server 200, the switch 300, or the storage 400) at the destination after the conversion.

(S13) The color conversion unit 170 reads the color arrangement information 111 stored in the storage unit 110.

(S14) The response reception unit 160 receives a response to the request having been transmitted from the VT server 200, the switch 300, or the storage 400 at Step S12. The response includes a URL and DOM data for the GUI. Note that, the processing at Step S13 may be executed after the processing at Step S14 has been executed.

(S15) The color conversion unit 170 extracts the URL and the DOM data from the response.

(S16) The color conversion unit 170 determines whether the DOM data included in the response received currently is DOM data due to the cancel or back operation based on the URL. If the DOM data is DOM data due to the cancel or back operation, the color conversion unit 170 proceeds the processing to Step S17. If the DOM data is not DOM data due to the cancel or back operation, the color conversion unit 170 proceeds the processing to Step S19. For example, the color conversion unit 170 may determine whether the current URL is responded in response to the cancel or back operation depending on whether the current URL matches the URL after the cancel or back operation registered in the cancellation count management table 112.

(S17) The color conversion unit 170 adds 1 to a setting value of the count (the cancellation count) of a record of a URL, among the URLs registered in the cancellation count management table 112, that matches the current URL. Further, as for the cancellation count for each URL, the color conversion unit 170 resets a setting value of the cancellation count to 0 after a predetermined period of time passes (for example, after 10 minutes pass) from the last update of the cancellation count.

(S18) The color conversion unit 170 determines whether the cancellation count of any URL registered in the cancellation count management table 112 reaches the threshold value. If the cancellation count reaches the threshold value (any of the cancellation counts=the threshold value), the color conversion unit 170 proceeds the processing to Step S27 (no color conversion is performed). If none of the cancellation counts reaches the threshold value (all the cancellation counts are less than the threshold value), the color conversion unit 170 proceeds the processing to Step S19.

(S19) The color conversion unit 170 determines whether the URL extracted at Step S15 is present in the color arrangement information 111. If present, the color conversion unit 170 proceeds the processing to Step S27 (no color conversion is performed). If not present, the color conversion unit 170 proceeds the processing to Step S20.

(S20) The color conversion unit 170 refers to the DOM data extracted at Step S15, and determines whether a frame is present. If a frame is present, the color conversion unit 170 proceeds the processing to Step S21. If no frame is present, the color conversion unit 170 proceeds the processing to Step S23. For example, the color conversion unit 170 determines whether a frame is present by searching the DOM data for predetermined selector information for the frame. If predetermined selector information for the frame is present in the DOM data, the frame is present. If the selector information is not present in the DOM data, no frame is present.

(S21) The color conversion unit 170 extracts selector information for the frame from the DOM data.

(S22) The color conversion unit 170 determines whether the extracted selector information is present in the color arrangement information 111. If present, the color conversion unit 170 proceeds the processing to Step S26 (no color conversion is performed in the concerned frame). If the URL extracted at Step S15 is not included, the color conversion unit 170 proceeds the processing to Step S23. When the processing is proceeded from Step S22 to Step S23, only an inside of the concerned frame is a target of color conversion from Step S23 to 25.

(S23) The color conversion unit 170 extracts information on a combination of a background color and a text color from the DOM data. Further, if the processing at Step S23 is performed after Step S22 is determined as No, the combination therein indicates the definition of color in the inside of the concerned frame. The color conversion unit 170 determines whether the extracted background color is a background color present in the color arrangement information 111. If the extracted background color is a background color present in the color arrangement information 111, the color conversion unit 170 proceeds the processing to Step S24. If the extracted background color is not the background color present in the color arrangement information 111, the color conversion unit 170 proceeds the processing to Step S26 (no color conversion is performed).

(S24) The color conversion unit 170 determines whether the text color extracted at Step S23 is a text color present in the color arrangement information 111. Here, the color conversion unit 170 makes a determination at Step S24 by comparing the text color extracted at Step S23 against each of text colors combined with the background color extracted at Step S23 among the text colors registered in the color arrangement information 111. In other words, the determination at Step S24 may be said to extract each combination including the background color matching the background color of the combination extracted at Step S23, from the color arrangement information 111, and determine whether the text colors in the two combinations match each other. If the extracted text color is the text color present in the color arrangement information 111 (the two combinations have the same background color and the same text color), the color conversion unit 170 proceeds the processing to Step S26 (the two combinations match each other from the beginning, and thus no color conversion is performed). If the extracted text color is not present in the color arrangement information 111 (the two combinations have the same background color but have different text colors), the color conversion unit 170 proceeds the processing to Step S25.

(S25) The color conversion unit 170 changes the text color. Specifically, the color conversion unit 170 replaces the portion where the text color is defined in the DOM data with information on the text color extracted from the color arrangement information 111. The processing at Step S25 is equivalent to processing of replacing the statement of text="# AAAAAA" in line 5 of the DOM data 810 with the statement of text="#000000" in line 5 of the DOM data 820 in the example of FIG. 9.

(S26) The color conversion unit 170 refers to the DOM data, and determines whether an unprocessed frame is present. If an unprocessed frame is present, the color conversion unit 170 proceeds the processing to Step S21. If no unprocessed frame is present, the color conversion unit 170 ends the processing. Note that, if Step S20 is determined as No, the current DOM data does not include a frame, and thus the color conversion unit 170 may preferably skip Step S26 and proceed the processing to Step S27.

(S27) The address conversion unit 140 sets a destination of the response including the DOM data to the client 500 and a transmission source thereof to the management server 100 (address conversion). When the color conversion is performed in the foregoing procedure, the DOM data included in the response at Step S27 is DOM data after the color conversion. In contrast, if no color conversion is performed in the foregoing procedure, the DOM data included in the response at Step S27 is the DOM data extracted at Step S15. The response transmission unit 180 transmits the response after the address conversion to the client 500.

Figure 11:
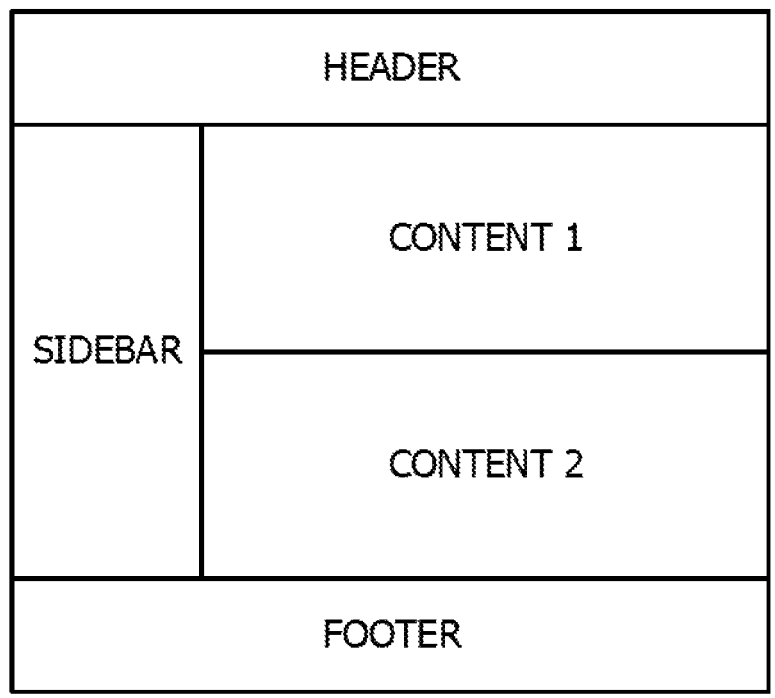
FIG. 11 is a diagram illustrating a layout example of a Web page.

FIG. 11 is a diagram illustrating a layout example of a Web page. A GUI is displayed as a Web page on a browser of the client 500. Here, a layout having multiple frames is available to the Web page. For example, different contents may be respectively displayed in frames including a header, a sidebar, a content 1, a content 2, and a footer. The management server 100 is capable of setting the Web page so as to cancel color conversion on a frame-by-frame basis. For example, in the example of the color arrangement information 111 of FIG. 6, the color conversion unit 170 cancels the color conversion of the content 1 (specified in the selector information "contents1") and the content 2 (specified in the selector information "contents2").

In addition, when the count of the cancel operation or the back operation by a user reaches the threshold value during the predetermined period of time, the color conversion unit 170 cancels the color conversion to a GUI of the concerned URL. This is because the comparatively high frequency of the cancel operation or the back operation by the user is a sign for a high possibility that the user has a discomfort feeling to the color design of the GUI. In this case, the color conversion unit 170 suppresses the color conversion to make it possible to suppress the discomfort feeling of the user, and to support a smooth setting work.

As in the foregoing, the management server 100 converts GUIs that are respectively provided from the VT server 200, the switch 300, and the storage 400 that belong to the VT library 10 into GUIs with a predetermined arrangement of colors using the color arrangement information 111. In this case, the user of the VT library 10 requests to set a combination of a background color and a text color or identification information on a frame or a URL that the user intends to exclude a target of color conversion into the color arrangement information 111, but does not request to directly edit DOM data of each GUI. This makes it possible to omit a work by the user due to the change in color design of the GUI, and improve the work efficiency in design change of the GUI.

Moreover, the management server 100 changes the arrangement of colors of the GUIs that are respectively provided from the VT server 200, the switch 300, and the storage 400, based on the color arrangement information 111. This makes it possible to provide GUIs with a uniform color design to some extent even when the models and the vendors of the VT server 200, the switch 300, and the storage 400 are different from one another. Therefore, the user requests to define, as the color arrangement information 111, combinations of a background color and a text color in accordance with the tendency of the arrangement of colors for use in the GUIs of the respective devices and the respective vendors. This enables the management server 100 to provide a GUI with the uniform arrangement of colors as a system product based on the color arrangement information 111 to the user. For example, providing a GUI with the uniform arrangement of colors as a system product of the VT library 10 to a user to make it possible to perform various kinds of notifications with the display that the user has a less discomfort feeling, for example, and contribute a suitable operating support for the VT library 10.

Note that, the information processing in the first embodiment may be implemented by causing the computation unit 1b to execute a program. Moreover, the information processing in the second embodiment may be implemented by causing the processor 101 to execute a program. The programs may be recorded on the computer-readable recording medium 13.

For example, distributing the recording medium 13 on which a program is recorded makes it possible to distribute the program. Moreover, a program is held in another computer, and the program may preferably be distributed via a network. The computer may preferably hold (install) the program recorded on the recording medium 13 or the program received from another computer in a storage device such as the RAM 102 or the HDD 103, read the program from the storage device, and execute the read program, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display control apparatus comprising:
 a memory that stores color arrangement information defining a plurality of second combinations each of a second background color and a second text color which are allowable combinations for a second user interface provided by a second device of a user; and
 a processor coupled to the memory and the processor configured to:
  obtain, based on a request of the user to obtain a first user interface provided by a first device which is different from the second device, first display information including a first combination of a first background color and a first text color which are included in the first user interface from the first device;
  search the plurality of second combinations in the memory based on the first combination;
  specify, from among the plurality of second combinations, a second combination in which the second background color of the second combination is the same as the first background color of the first combination;
  generate second display information which is used to display the second user interface on a display of the second device of the user by using the specified second combination as a substitution of the first combination;
  cause the display to display the second user interface based on the second display information in a case in which the first background color of the first combination matches the second background color of one of second combination included in the plurality of second combinations and the first text color of the first combination is different from the second text color of the one of second combination; and cause the display to display the first user interface based on the first display information, in a case in which the first background color of the first combination is different from the second background color of each of the plurality of the second combinations, without a comparison between the first text color of the first combination and the second text color of the respective second combinations.

2. The display control apparatus according to claim 1, wherein the color arrangement information includes frame information indicating a designation of one or more frames to be included in the first user interface; and wherein the processor is configured to:
determine, for each frames included in the first user interface corresponding to the first display information, whether the displaying based on the second display information is executed in accordance with the frame information.

3. The display control apparatus according to claim 1, wherein the processor is configured to:
determine which of the first combination and the second combination is used for displaying the second user interface based on the number of times that a predetermined operation on the second user interface is performed by a user.

4. The display control apparatus according to claim 3, wherein the predetermined operation is a cancel operation on the second user interface or a back operation on a browser on which the second user interface is displayed.

5. The display control apparatus according to claim 1, wherein the display control apparatus is coupled to the second device that is coupled to or includes the display; wherein the processor is configured to:
when the request is received from the second device, specify a target first device among from a plurality of devices including the first device based on the request;
transfer the request to the target first device; and
obtain a response to the request and the first display information.

6. A non-transitory computer-readable storage medium storing a display control program that causes a computer to execute a process, the process comprising:
obtaining color arrangement information in a memory, the color arrangement information defining a plurality of second combinations each of a second background color and a second text color which are allowable combinations for a second user interface provided by a second device of a user;
obtaining, based on a request of the user to obtain a first user interface provided by a first device which is different from the second device, first display information including a first combination of a first background color and a first text color which are included in the first user interface from the first device;
searching the plurality of the second combinations in the memory based on the first combination;
specifying, from among the plurality of the second combinations, a second combination in which the second background color of the second combination is the same as the first background color of the first combination;
generating second display information which is used to display the second user interface on a display of the second device of the user by using the specified second combination as a substitution of the first combination;
causing the display to display the second user interface based on the second display information in a case in which the first background color of the first combination matches the second background color of one of second combination included in the plurality of second combinations and the first text color of the first combination is different from the second text color of the one of second combination; and
causing the display to display the first user interface based on the first display information, in a case in which the first background color of the first combination is different from the second background color of each of the plurality of the second combinations, without a comparison between the first text color of the first combination and the second text color of the respective second combinations.

7. The non-transitory computer-readable storage medium according to claim 6, wherein the color arrangement information includes frame information indicating a designation of one or more frames to be included in the first user interface; and wherein the process further includes:
determining, for each frames included in the first user interface corresponding to the first display information, whether the displaying based on the second display information is executed in accordance with the frame information.

8. The non-transitory computer-readable storage medium according to claim 6, wherein the process further includes:
determining which of the first combination and the second combination is used for displaying the second user interface based on the number of times that a predetermined operation on the second user interface is performed by a user.

9. The non-transitory computer-readable storage medium according to claim 8, wherein the predetermined operation is a cancel operation on the second user interface or a back operation on a browser on which the second user interface is displayed.

10. The non-transitory computer-readable storage medium according to claim 6, wherein the display control apparatus is coupled to the second device that is coupled to or includes the display; wherein the process further includes:
when the request is received from the second device, specifying a target first device among from a plurality of devices including the first device based on the request;
transferring the request to the target first device; and
obtaining a response to the request and the first display information.

11. A display control method executed by a computer, the display control method comprising:
obtaining color arrangement information in a memory, the color arrangement information defining a plurality of second combinations each of a second background color and a second text color which are allowable combinations for a second user interface provided by a second device of a user; and
obtaining, based on a request of the user to obtain a first user interface provided by a first device which is different from the second device, first display information including a first combination of a first background color and a first text color which are included in the first user interface from the first device;
searching the plurality of the second combinations in the memory based on the first combination;
specifying, from among the plurality of the second combinations, a second combination in which the second background color of the second combination is the same as the first background color of the first combination; and generating second display information which is used to display the second user interface on a display of the second device of the user by using the specified second combination as a substitution of the first combination;

causing the display to display the second user interface based on the second display information in a case in which the first background color of the first combination matches the second background color of one of second combination included in the plurality of second combinations and the first text color of the first combination is different from the second text color of the one of second combination; and causing the display to display the first user interface based on the first display information, in a case in which the first background color of the first combination is different from the second background color of each of the plurality of the second combinations, without a comparison between the first text color of the first combination and the second text color of the respective second combinations.

12. The display control method according to claim 11, wherein the color arrangement information includes frame information indicating a designation of one or more frames to be included in the first user interface; and the method further includes:

determining, for each frames included in the first user interface corresponding to the first display information, whether the displaying based on the second display information is executed in accordance with the frame information.

13. The display control method according to claim 11, further comprising:

determining which of the first combination and the second combination is used for displaying the second user interface based on the number of times that a predetermined operation on the second user interface is performed by a user.

14. The display control method according to claim 13, wherein the predetermined operation is a cancel operation on the second user interface or a back operation on a browser on which the second user interface is displayed.

15. The display control method according to claim 11, wherein the display control apparatus is coupled to the second device that is coupled to or includes the display; wherein the method further includes:

when the request is received from the second device, specifying a target first device among from a plurality of devices including the first device based on the request;

transferring the request to the target first device; and obtaining a response to the request and the first display information.

* * * * *